United States Patent
Wang et al.

(10) Patent No.: US 8,339,940 B2
(45) Date of Patent: Dec. 25, 2012

(54) MULTI-ACTIVE DETECTION METHOD AND STACK MEMBER DEVICE

(75) Inventors: Pengju Wang, Beijing (CN); Xiaolong Hu, Beijing (CN)

(73) Assignee: Hangzhou H3C Technologies, Co., Ltd., Zhejiang (CN)

( * ) Notice: Subject to any disclaimer, the term of this patent is extended or adjusted under 35 U.S.C. 154(b) by 427 days.

(21) Appl. No.: 12/765,948

(22) Filed: Apr. 23, 2010

(65) Prior Publication Data

US 2010/0329111 A1    Dec. 30, 2010

(30) Foreign Application Priority Data

Jun. 26, 2009  (CN) .......................... 2009 1 0088345

(51) Int. Cl.
G01R 31/08 (2006.01)
H04L 12/28 (2006.01)
G06F 11/00 (2006.01)

(52) U.S. Cl. ............ 370/217; 370/252; 370/255; 714/2; 398/3

(58) Field of Classification Search .......... 370/216–228, 370/242, 244–245, 250, 254–256, 258, 464–467, 370/473; 398/1–8; 709/238, 239, 242, 251–253; 714/2, 4.11

See application file for complete search history.

(56) References Cited

U.S. PATENT DOCUMENTS

| | | | |
|---|---|---|---|
| 7,486,610 B1 * | 2/2009 | Bhupalam et al. | 370/216 |
| 7,486,611 B1 * | 2/2009 | Wilson | 370/220 |
| 7,564,779 B2 * | 7/2009 | Rose et al. | 370/223 |
| 8,098,571 B2 * | 1/2012 | Santoso et al. | 370/216 |
| 2006/0092849 A1 * | 5/2006 | Santoso et al. | 370/244 |
| 2009/0073875 A1 * | 3/2009 | Kashyap | 370/228 |
| 2009/0086620 A1 * | 4/2009 | Fowler et al. | 370/216 |
| 2009/0129398 A1 * | 5/2009 | Riegel et al. | 370/401 |
| 2009/0245137 A1 * | 10/2009 | Hares et al. | 370/254 |
| 2010/0014433 A1 | 1/2010 | Wang et al. | |
| 2012/0008635 A1 * | 1/2012 | Kuo et al. | 370/410 |

* cited by examiner

*Primary Examiner* — Habte Mered

(57) ABSTRACT

The present invention discloses a method of multi-active detection and a stack member device. Each member device in a stack is configured with a detection interface that is assigned an IP address, wherein the IP address of the detection interface on the designated active device is activated. Each member devices is also configured with an active device election rule, and with a correspondence between the IP address of the detection interface on each member device and the active device election parameter of the member device. Upon detection that the stack has become split, each designated standby device transitions to become an active device and activates the IP address of its detection interface. Each active device then uses the IP address of its detection interface as the source IP address to establish a session with other active devices, finds the active device election parameter according to the source IP address in the received session packet, and elects an active device that maintains its active state according to the configured active device election rule. The present invention implements multi-active detection in a stack.

27 Claims, 7 Drawing Sheets

MULTI-ACTIVE DETECTION METHOD AND STACK MEMBER DEVICE

CROSS-REFERENCE TO RELATED APPLICATIONS

This application claims the benefit under 35 U.S.C. §119(a)-(d) of Chinese Application 200910088345.6 filed on Jun. 26, 2009.

TECHNICAL FIELD

The present invention relates in general to the stacking field and, more particularly, to a multi-active detection method and stack member device.

BACKGROUND OF THE INVENTION

Stacking technology connects two or more devices to form a logical device. Users can manage two or more devices by managing a single logical device. Stacking technology can provide high availability and high scalability and simplify management. All devices in a stack use the same configuration file.

Devices in a stack are connected by stack cables. FIG. 1 illustrates a typical stack. As illustrated in this figure, there is an active device in the stack, and others are standby devices. The active device manages the control plane, including executing and applying configurations. The active and standby devices run the data plane and forward data. Data that the standby devices need is applied by the active device.

If the stack cables connecting the active and standby devices are broken, there will be two or more active devices with the same global configuration in the network. When these devices are connected through other links, network failure may occur; for example, IP address collision and Layer 2 protocol computation failure can occur. Therefore, how to detect multi-active collision has become a pending problem of multi-device stacking.

The virtual switching system (VSS) of Cisco allows combination of at most two Catalyst 6500 series switches. VSS uses two mechanisms to detect and solve dual-active collision.

One mechanism is enhanced Port Aggregation Protocol (PAgP). As illustrated in FIG. 2, Cisco has extended the PAgP protocol packets. The new active device carries its ACTIVE_ID in a PAgP packet and sends it to the original active device. If the original active device finds that the ACTIVE_ID in the received PAgP packet is not the same as its local ACTIVE_ID, it considers multi-active collision to have occurred, and then disables all local interfaces. In this way, multi-active collision can be solved.

The other mechanism is Bidirectional Forwarding Detection (BFD). As illustrated in FIG. 3, a respective Layer 3 interface is selected on the two devices in the stack, different IP addresses and static routes are assigned for the two interfaces, and the two interfaces are connected with network cables. When the stack works normally, the BFD session is in a down state; when the stack link fails, the static route on the standby device takes effect, and the BFD session is in an up state, so multi-active collision is detected.

These two mechanisms of Cisco can only support stacking of two devices; that is, they can only implement dual-active detection. When there are more than two devices to be stacked, multi-active detection is needed, and the two mechanisms cannot satisfy the need. As illustrated in FIG. 4, with enhanced PAgP adopted, the original active device is disabled, but collision exists between new active device 1 and new active device 2. The same problem occurs when BFD is deployed.

SUMMARY OF THE INVENTION

The present invention provides a multi-active detection method and stack member device to implement detection of multiple devices in a stack.

An embodiment of the present invention comprises a method of multi-active detection in a stack, wherein the method comprises: configuring a detection interface on each member device in a stack, assigning an IP address for each detection interface, activating the IP address of the detection interface on the active device, configuring an active device election rule on each member device, and configuring the correspondence between the IP address of the detection interface on each member device and the active device election parameter of the member device.

The method further comprises: a standby device detecting a stack link failure after the stack is split, and becoming an active device and activating the IP address of its detection interface. Each device that becomes active in this way uses the IP address of its detection interface as the source IP address to establish a session with other active devices, finds an active device election parameter according to the source IP address in the received session packet, and, based on a configured active device election rule, elects an active device from among the active devices that remains in its active state.

In further accordance with the method, the session that is established among the active devices is a BFD session.

Still further, the detection interface on each device is a Layer 3 physical interface, or a VLAN interface, and the detection interfaces of the member devices in the stack are connected through a Layer 2 switch.

The IP addresses of the detection interfaces on all member devices in the stack can be in the same segment, or can be in different segments. When the IP addresses are in different segments, a static route is configured on the detection interface of each member device to the detection interfaces of all the other member devices.

Additionally, the active device election parameter can be any one or combination of member ID, device priority, and device CPU MAC.

The embodiment further provides a stack member device, the stack member device comprising: a link failure detection module used for detecting stack link failure. A stack comprises a plurality of stack member devices, any given one referred to as a "local device" with respect to operations carried out in response to detection of a link failure. If the (local) stack member device is a standby device when a stack link failure is detected, it becomes an active device and sends an IP address activation notification to the IP address activation module. If the (local) stack member device is an active device when a stack link failure is detected, it sends a session establishment notification to the active device election module.

In accordance with the embodiment, the IP address activation module is used for receiving the IP address activation notification, activating the IP address of the detection interface on the local device and sending a session establishment notification to the active device election module.

The active device election module is used for saving the correspondence between the IP address of the detection interface of each member device and the active device election parameter of the member device; receiving the session establishment notification; using the IP address of the detection interface of the local device as the source IP address to establish a session with other active devices; searching the corresponding active device election parameter according to the source IP address contained in the received session packet; and electing an active that maintains its active state according to the saved active device election rule and the active election parameter of each active device in the stack.

In further accordance with the embodiment, the detection interface of the stack member device is connected to a Layer 2 switch.

The present invention discloses a method of multi-active detection and a stack member device, wherein a detection interface is configured on each member device in a stack, an IP address is assigned for each detection interface, the IP address of the detection interface of each active device is activated, an active device election rule is configured on each member device, and the correspondence between the IP address of the detection interface on each member device and the active device election parameter of the member device is configured. Upon splitting of a stack, a standby device transitions to become the active device and activates the IP address of its detection interface. Each active device uses the IP address of its detection interface as the source IP address to establish a session with other active devices, and then finds the active device election parameter according to the source IP address in the received session packet. The devices that are (or have become) active then use the configured active device election rule to elect from among them an active device that remains in its active. The present invention implements multi-active detection in a stack.

DETAILED DESCRIPTION OF THE INVENTION

In the following description of embodiments of the present invention, specific details are provided for a complete understanding of the embodiments of the invention.

Figure 1:
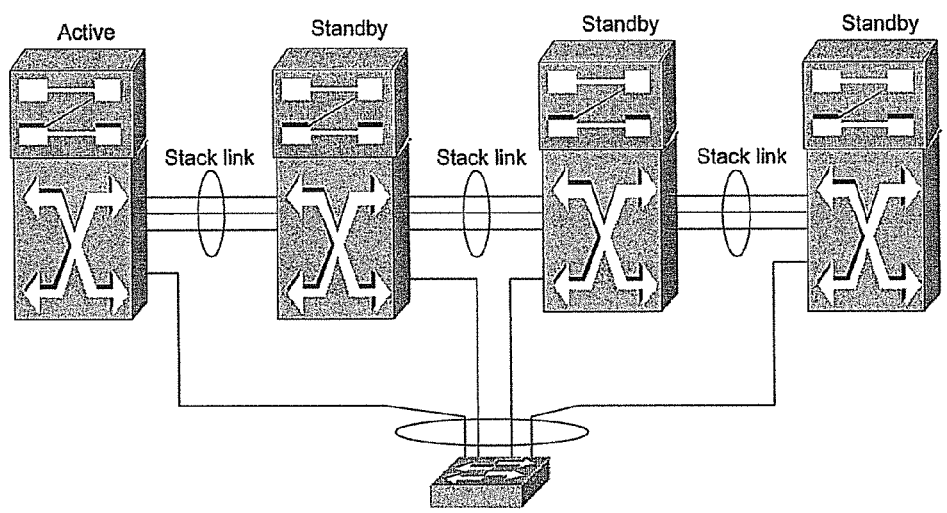
FIG. 1 illustrates a typical stack.
Figure 2:
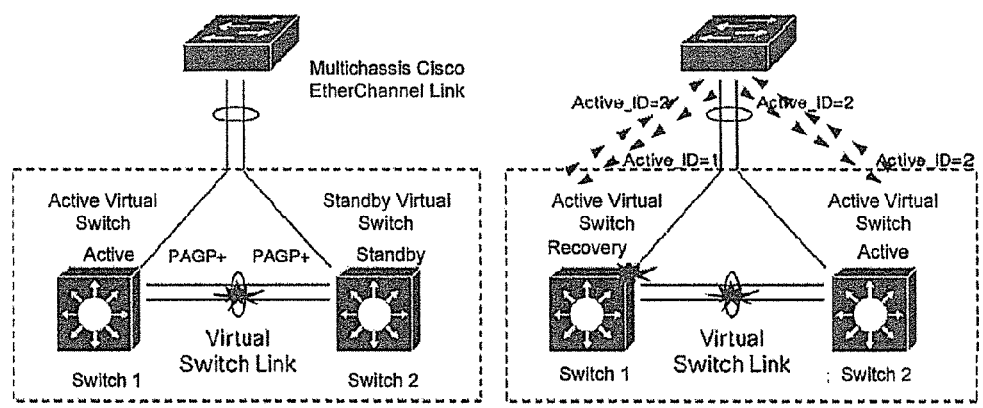
FIG. 2 illustrates the dual-active detection with the enhanced PAgP mechanism of Cisco.
Figure 3:
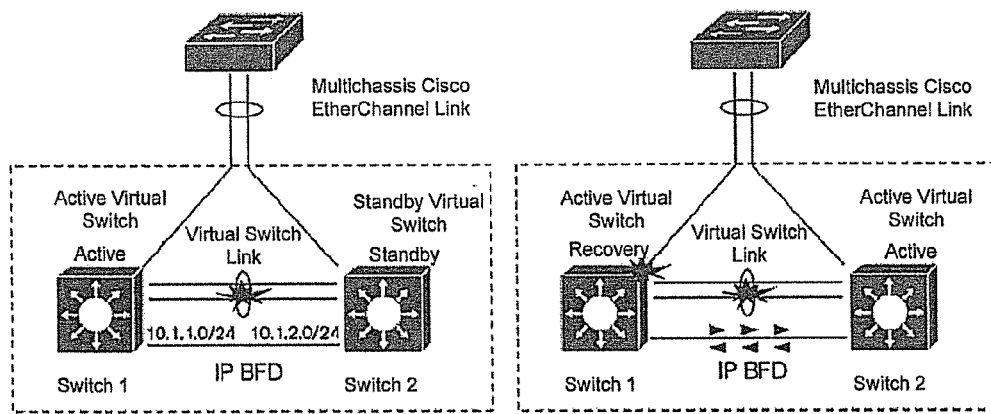
FIG. 3 illustrates the dual-active detection with BFD of Cisco.
Figure 4:
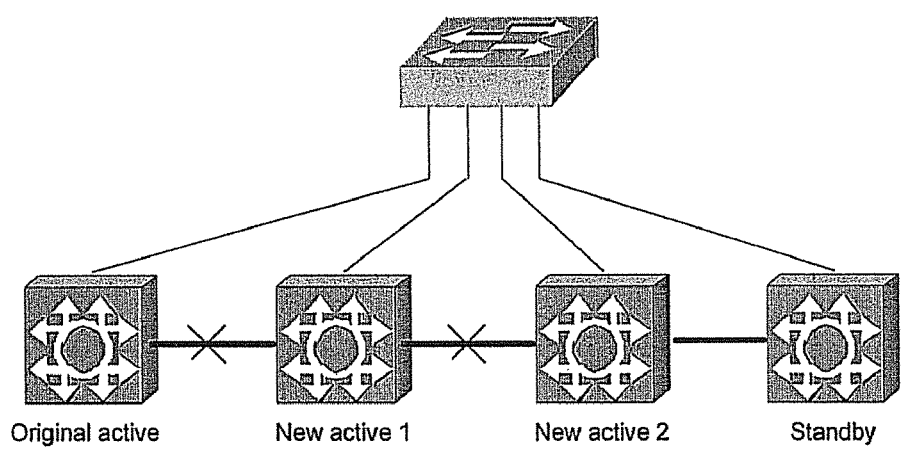
FIG. 4 illustrates the multi-active detection with the enhanced PAgP mechanism of Cisco.
Figure 5:
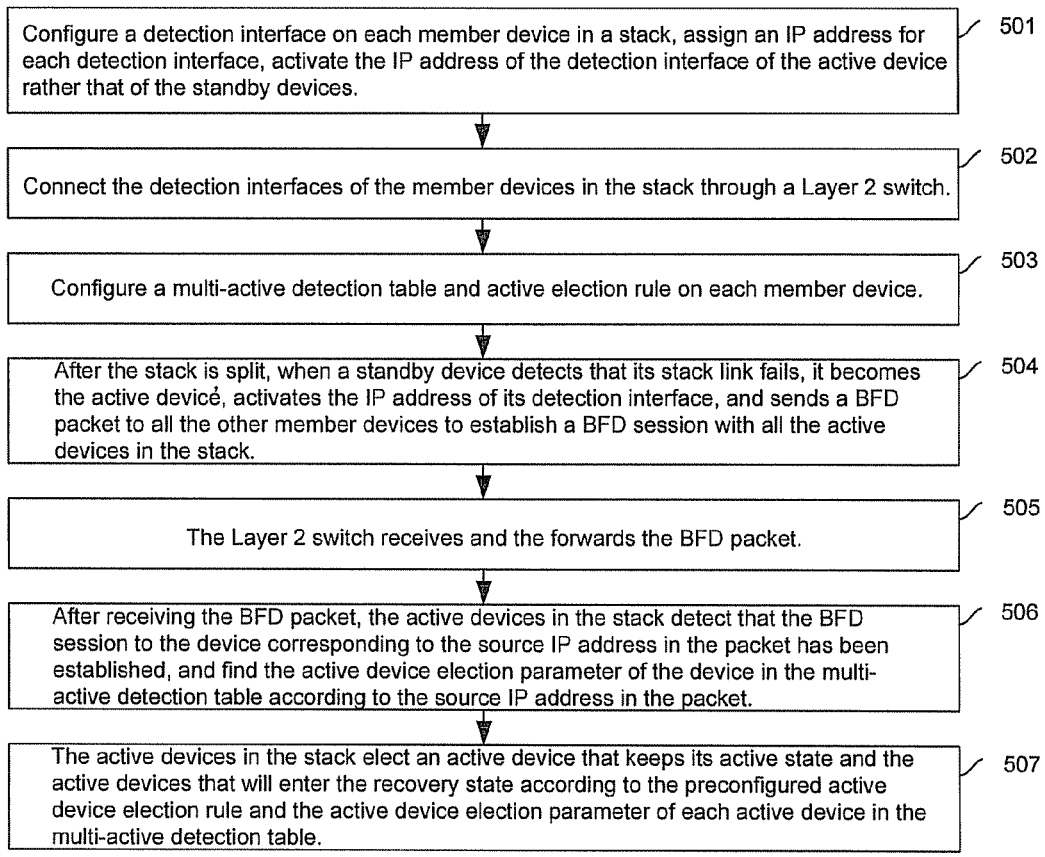
FIG. 5 is a flow chart illustrating multi-active detection in a stack according to an embodiment of the present invention.

FIG. 5 is a flow chart illustrating multi-active detection in a stack according to an embodiment of the present invention. As illustrated in FIG. 5, the steps comprise:

At step 501, a detection interface is configured on each member device in a stack, an IP address is assigned for each detection interface, and the IP address of the detection interface of the active device is activated. The IP address of the detection interface of each standby device is not activated.

The detection interface is a Layer 3 physical interface or VLAN interface. A device without a Layer 3 physical interface can use a VLAN interface as the detection interface; a device with a Layer 3 physical interface can use the Layer 3 physical interface or a VLAN interface as the detection interface.

The IP addresses of the detection interfaces of all the member devices can belong to the same segment or different segments. If they belong to different segments, a static route to all the other detection interfaces needs to be configured for each detection interface.

At step 502, the detection interfaces of the member devices in the stack are connected through a Layer 2 switch.

At step 503, both a multi-active detection table and active election rule are configured on each member device.

The multi-active detection table includes the IP address of the detection interface of each member device and the active device election parameter of the member device. The active device election parameter can be any one or combination of member ID, CPU-MAC and priority.

The active device election rule is as follows:

Upon detecting that the stack is split, the active device with the highest priority remains in the active state, and the other active devices enter into a recovery state. In this case, priority is the active device election parameter.

Alternatively, the active device with the highest CPU-MAC remains in the active state, and the other active devices enter into the recovery state. In this case, CPU-MAC is the active device election parameter.

As still a further alternative, the active device with the highest member ID remains in the active state, and the other active devices enter into the recovery state. In this case, member ID is the active device election parameter.

In the case of two devices with the same priority, the active device with a greater member ID remains in the active state, while the other device enters into the recovery state. In this instance, priority plus member ID is the active device election parameter. Alternatively, the device with a high CPU MAC address remains in the active state, and the other device enters into the recovery state. In this instance, priority plus CPU MAC is the active device election parameter.

Table 1 shows a multi-active detection table.

TABLE 1

| Multi-active detection table | | | |
|---|---|---|---|
| IP address | Member ID | CPU-MAC | Priority |
| 192.168.10.1 | 1 | 00-e0-fc-01-01-01 | 2 |
| 192.168.10.2 | 2 | 00-e0-fc-01-01-02 | 1 |
| 192.168.10.3 | 3 | 00-e0-fc-01-01-03 | 3 |
| 192.168.10.4 | 4 | 00-e0-fc-01-01-04 | 4 |

At step 504, after the stack is split, when a standby device detects its stack link failure, it transitions to become the active device, activates the IP address of its detection interface, and sends a BFD packet to all the other member devices according to the IP addresses of the detection interfaces of these member devices to establish a BFD session with all the active devices in the stack. The source IP address of the BFD packet is the IP address of the detection interface of the local device.

When the standby device transitions to become an active device, it does not know which other standby devices have become active devices. Therefore, it will send BFD packets to all the other member devices in the stack. For example, consider a stack with N member devices. At step 504, when a standby device transitions to become an active device, it needs to send BFD packets to N−1 member devices.

Note that the original active device will send BFD packets to all the other member devices after detecting any stack link failure, because the IP address of the detection interface of the original active device has been activated.

At step 505, the Layer 2 switch receives and then forwards the BFD packet.

At step 506, after receiving the BFD packet, the active devices in the stack detect that the BFD session to the device corresponding to the source IP address in the packet has been established, and find the active device election parameter of the device in the multi-active detection table according to the source IP address in the packet.

At step 507, the active devices in the stack elect an active device that maintains its active state, as well as the active devices that will enter into the recovery state according to the preconfigured active device election rule and the active device election parameter of each active device in the multi-active detection table.

Figure 6:
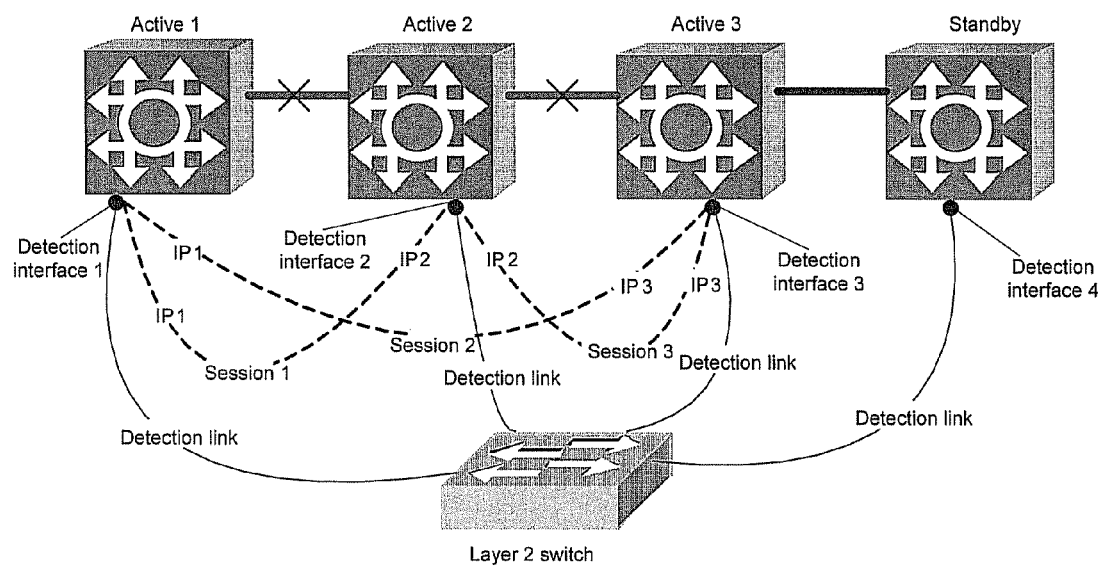
FIG. 6 is the schematic diagram illustrating multi-active detection in a stack according to an embodiment of the present invention.

FIG. 6 is an embodiment of multi-active detection provided by the present invention. As illustrated in FIG. 6, there are four devices, Device 1 through Device 4, in the stack. The IP addresses of the detection interfaces of the four devices are IP 1 through IP 4, and all the detection interfaces are connected to the same Layer 2 switch. Initially, Device 1 is the active device, Devices 2 through 4 are standby devices, IP 1 is activated, and IP 2 through IP 4 are not activated. The multi-active detection table configured on Device 1 through Device 4 includes the correspondence between each member ID and IP address, and the active device election rule configured on Device 1 through Device 4 is configured such that the active device with the smallest member ID maintains its active state.

When the stack links between Device 1 and Device 2, and between Device 2 and Device 3 fail, the standby devices Device 2 and Device 3 become active devices Active 2 and Active 3, and IP 2 and IP 3 are activated. Each of Devices 1, 2, and 3 sends respective BFD packets to the Layer 2 switch, and two BFD sessions are established on each active device. Specifically: (i) on Device 1 there is BFD session 1 between IP 1 and IP 2, and BFD session 2 between IP 1 and IP 3; (ii) on Device 2 there is BFD session 1 between IP 2 and IP1, and BFD session 3 between IP 2 and IP 3; and (iii) on Device 3 there is BFD session 2 between IP 3 and IP 1, and BFD session 3 between IP 3 and IP 2.

When BFD session 1 on Device 1 is up (i.e., established and active), Device 1 detects that the peer IP address is IP 2, so it determines that Device 2 corresponding to IP 2 is an active device.

When BFD session 2 on Device 1 is up, Device 1 detects that the peer IP address is IP 3, so it determines that Device 3 corresponding to IP 3 is an active device.

When BFD session 1 on Device 2 is up, Device 2 detects that the peer IP address is IP 1, so it determines that Device 1 corresponding to IP 1 is an active device.

When BFD session 3 on Device 2 is up, Device 2 detects that the peer IP address is IP 3, so it determines that Device 3 corresponding to IP 3 is an active device.

When BFD session 2 on Device 3 is up, Device 3 detects that the peer IP address is IP 1, so it determines that Device 1 corresponding to IP 1 is an active device.

When BFD session 3 on Device 3 is up, Device 3 detects that the peer IP address is IP 2, so it determines that Device 2 corresponding to IP 2 is an active device.

Finally, Devices 1, 2 and 3 elect Device 1 to remain in its active state, and Device 2 and Device 3 enter into their respective recovery states according to the configured active device election rule; i.e., the active device with the smallest member ID remains in its active state.

Figure 7:
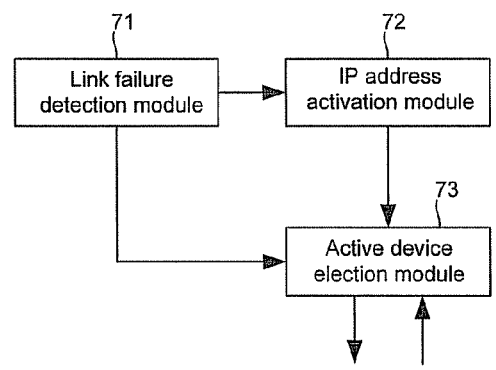
FIG. 7 illustrates the structure of a stack member device according to an embodiment of the present invention.

FIG. 7 illustrates the structure of a stack member device according to an embodiment of the present invention. As illustrated in FIG. 7, the stack member device comprises a link failure detection module 71, an IP address activation module 72, and an active device detection module 73.

The link failure detection module 71 is used for detecting stack link failure of the local device. If the device is a standby device when a link failure is detected, it transitions to become an active device and sends an IP address activation notification to the IP address activation module 72. If the local device is an active device when a link failure is detected, it sends a session establishment notification to the active device election module 73.

The IP address activation module 72 is used for receiving the IP address activation notification sent by link failure detection module 71, activating the IP address of the detection interface of the local device, and sending a session establishment notification to the active device election module 73.

The active device election module 73 is used for saving the active device election rule, and saving the correspondence between the IP address of the detection interface of each member device and the active device election parameter of the active device. The active device election module is also used for receiving the session establishment notification sent by the link failure detection module 71 or the IP address activation module 72; using the IP addresses of the detection interfaces of other member devices as the destination IP addresses and the IP address of the detection interface of the local device as the source IP address to establish sessions with other active devices; searching the active device election parameter corresponding to the source IP address in the received session packets; and electing among the active devices of the current stack the active device that maintains its active state and the active devices that need to enter into their respective recovery states according the saved active device election rule and the active device election parameter of each active device.

Although an embodiment of the invention and its advantages are described in detail, a person skilled in the art could make various alternations, additions, and omissions without departing from the spirit and scope of the present invention as defined by the appended claims.

What is claimed is:

1. In a stack device having a detection interface and being configured as part of a stacking system comprising a plurality of stack member devices including the stack device, the plurality of stack member devices being communicatively connected to each other by one or more stack links, a method comprising:

operating in one of (i) an active state in which, at least, an IP address of the detection interface is activated, or (ii) a standby state in which, at least, the IP address of the detection interface is not activated;

upon detecting a stack link failure while operating in the active state, transmitting a first election parameter packet to each other stack member device of the plurality, wherein the IP address of the detection interface is used as a source address in the first election parameter packet;

upon detecting a stack link failure while operating in the standby state, transitioning to operating in the active state, activating the IP address of the detection interface, and transmitting a second election parameter packet to each other stack member device of the plurality, wherein the IP address of the detection interface is used as a source address in the second election parameter packet;

upon receiving an incoming election parameter packet from at least one of the other stack member devices of the plurality while operating in the active state during an interval in which the stack device does not detect a stack link failure, transmitting a third election parameter packet to the at least one of the other stack member devices of the plurality, wherein the IP address of the detection interface is used as a source address in the third election parameter packet; and in response to receiving a respective incoming election parameter packet from at least one other stack member device of the plurality, electing one member device from among the stack device and the at least one other stack member device of the plurality based on both an active device election parameter in the respective incoming election parameter packet and an active device election rule configured in the stack device, wherein the elected one member device thereafter becomes the only stack member device of the plurality to remain in the active state.

2. The method of claim 1, wherein the active device election rule comprises a table stored on the stack device of all stack member devices of the plurality and a respective active device election parameter associated with each stack member device, and wherein electing the one member device from among the stack device and the at least one other stack member device of the plurality comprises comparing the active device election parameter in the respective incoming election parameter packet from the at least one other stack member device of the plurality with the respective active device election parameter associated with the at least one other stack member device of the plurality in the stored table.

3. The method of claim 1, further comprising:
determining that the stack device is not the elected one member device; and
responsively transitioning to operating in a recovery state.

4. The method of claim 1, wherein transmitting the first election parameter packet to each other stack member device of the plurality comprises requesting a Bidirectional Forwarding Detection (BFD) session with each other member device of the plurality,
wherein transmitting the second election parameter packet to each other member device of the plurality comprises requesting a BFD session with each other stack member device of the plurality,
and wherein transmitting the third election parameter packet to the at least one of the other stack member devices of the plurality comprises requesting a BFD session with the at least one of the other stack member devices of the plurality.

5. The method of claim 4, wherein receiving the respective incoming election parameter packet from the at least one other stack member device of the plurality comprises establishing a BFD session with the at least one other stack member device of the plurality while the at least one other stack member device of the plurality is operating in an active state.

6. The method of claim 1, wherein the detection interface is a Layer 3 physical interface or a Virtual Local Area Network interface.

7. The method of claim 1, wherein the detection interface of the stack device is connected to a Layer 2 switch,
wherein transmitting the first election parameter packet to each other stack member device of the plurality comprises transmitting the first election parameter packet to each other stack member device of the plurality via the Layer 2 switch,
wherein transmitting the second election parameter packet to each other stack member device of the plurality comprises transmitting the second election parameter packet to each other stack member device of the plurality via the Layer 2 switch,
wherein transmitting the third election parameter packet to the at least one of the other stack member devices of the plurality comprises transmitting the third election parameter packet to the at least one of the other stack member devices of the plurality via the Layer 2 switch,
and wherein receiving the respective incoming election parameter packet from the at least one other stack member device of the plurality comprises receiving the respective incoming election parameter packet from the at least one other stack member device of the plurality via the Layer 2 switch.

8. The method of claim 1, wherein the detection interface of the stack device is connected to a respective detection interface on each of the other stack member devices of the plurality via a Layer 2 switch, each respective detection interface having a respective IP address,
and wherein the IP address of the detection interface of the stack device together with all of the respective IP addresses of are in a common segment.

9. The method of claim 1, wherein the detection interface of the stack device is connected to a respective detection interface on each of the other stack member devices of the plurality via a Layer 2 switch, each respective detection interface having a respective IP address,
and wherein the IP address of the detection interface of the stack device together all of the respective IP addresses of are not in a common segment, and a static route is configured for every pair of IP addresses.

10. The method of claim 1, wherein the active device election parameter is any one of or any combination of member ID, device priority, and device CPU MAC address.

11. In a stacking system comprising a plurality of stack member devices, the plurality of stack member devices communicatively connected to each other by one or more stack links, a method comprising:
operating one stack member device of the plurality in an active state in which, at least, an IP address of a detection interface of the one stack member device is activated;
operating each of the other stack member devices of the plurality in a standby state in which, at least, an IP address of a respective detection interface on each of the other stack member devices is not activated;
upon detection by the one stack member device of a stack link failure while the one stack member device is operating in the active state, the one stack member device transmitting a first election parameter packet to each other stack member device of the plurality, wherein the IP address of the detection interface of the one stack member device is used as a source address in the first election parameter packet;
upon detection by at least one of the other stack member devices of the plurality of a stack link failure while the at least one of the other stack member devices is operating in the standby state, the at least one of the other stack member devices transitioning to operating in the active state, activating the IP address of the respective detection interface of the at least one of the other stack member devices, and transmitting a second election parameter packet to each other stack member device of the plurality including the one stack member device, wherein the IP address of the respective detection interface of the at least one of the other stack member devices is used as a source address in the second election parameter packet;

upon receipt by the one stack member device of an incoming election parameter packet from at least one of the other stack member devices of the plurality while the one stack member device is operating in the active state during an interval in which the one stack member device does not detect a stack link failure, the one stack member device transmitting a third election parameter packet to the at least one of the other stack member devices of the plurality, wherein the IP address of the detection interface of the one stack member device is used as a source address in the third election parameter packet; and at each given stack member device of the plurality operating in the active state subsequent to detection by at least one stack member device of the plurality of a stack link failure, responding to receiving a respective incoming election parameter packet from at least one other stack member device of the plurality by electing one member device from among the given stack member device and the at least one other stack member device of the plurality based on both an active device election parameter in the respective incoming election parameter packet and an active device election rule configured in the given stack member device, wherein the elected one member device thereafter becomes the only stack member device of the plurality to remain in the active state.

12. The method of claim 11, wherein the active device election rule comprises a table stored on the given stack member device of all stack member devices of the plurality and a respective active device election parameter associated with each stack member device, and wherein electing the one member device from among the given stack member device and the at least one other stack member device of the plurality comprises comparing the active device election parameter in the respective incoming election parameter packet from the at least one other stack member device of the plurality with the respective active device election parameter associated with the at least one other stack member device of the plurality in the stored table.

13. The method of claim 11, further comprising:
the given stack member device determining that it is not the elected one member device; and
the given stack member device responsively transitioning to operating in a recovery state.

14. The method of claim 11, wherein transmitting the first election parameter packet to each other stack member device of the plurality comprises requesting a Bidirectional Forwarding Detection (BFD) session with each other member device of the plurality, wherein transmitting the second election parameter packet to each other stack member device of the plurality including the one stack member device comprises requesting a BFD session with each other stack member device of the plurality including the one stack member device, and wherein transmitting the third election parameter packet to the at least one of the other stack member devices of the plurality comprises requesting a BFD session with the at least one of the other stack member devices of the plurality.

15. The method of claim 14, wherein receiving the respective incoming election parameter packet from at least one other stack member device of the plurality comprises establishing a BFD session with the at least one other stack member device of the plurality while the at least one other stack member device of the plurality is operating in an active state.

16. The method of claim 11, wherein the detection interface of the one stack member device is a Layer 3 physical interface or a Virtual Local Area Network (VLAN) interface, and wherein the respective detection interface on each of the other stack member devices is a Layer 3 physical interface or a VLAN interface.

17. The method of claim 11, wherein the detection interface of the one stack member and the respective detection interface on each of the other stack member devices are all connected to a Layer 2 switch, wherein transmitting the first election parameter packet to each other stack member device of the plurality comprises transmitting the first election parameter packet to each other stack member device of the plurality via the Layer 2 switch, wherein transmitting the second election parameter packet to each other stack member device of the plurality including the one stack member device comprises transmitting the second election parameter packet to each other stack member device of the plurality including the one stack member device via the Layer 2 switch, wherein transmitting the third election parameter packet to the at least one of the other stack member devices of the plurality comprises transmitting the third election parameter packet to the at least one of the other stack member devices of the plurality via the Layer 2 switch, and wherein receiving the respective incoming election parameter packet from the at least one other stack member device of the plurality comprises receiving the respective incoming election parameter packet from the at least one other stack member device of the plurality via the Layer 2 switch.

18. The method of claim 11, wherein the detection interface of the one stack member and the respective detection interface on each of the other stack member devices are all connected to a Layer 2 switch, and wherein the IP address of the detection interface of the one stack member device and the IP address of the respective detection interface on each of the other stack member devices are all in a common segment.

19. The method of claim 11, wherein the detection interface of the one stack member and the respective detection interface on each of the other stack member devices are all connected to a Layer 2 switch, and wherein the IP address of the detection interface of the one stack member device and the IP address of the respective detection interface on each of the other stack member devices are not all in a common segment, and a static route is configured for every pair of IP addresses.

20. The method of claim 11, wherein the active device election parameter is any one of or any combination of member ID, device priority, and device CPU MAC address.

21. A stack device configured to operate as part of a stacking system comprising a plurality of stack member devices including the stack device, wherein the plurality of stack member devices are configured to be communicatively connected to each other by one or more stack links, the stack device comprising:

a detection interface configured to be communicatively connected to a respective detection interface on each of the other stack member devices of the plurality, wherein the detection interface of the stack device has an IP address;

a link failure detection module configured to detect a stack link failure, and further configured to (i) send a session establishment notification if the stack device is operating in an active state when the stack link failure is detected, or (ii) transition the stack device to the active state and send an IP address activation notification if the stack device is operating in a standby state when the stack link failure is detected;

an IP address activation module configured to receive an IP address activation notification from the link failure detection module, and to responsively activate the IP address of the detection interface and send a session establishment notification; and an active device election module configured to receive a session establishment notification from either of the link failure detection module or the IP address activation module, and to respond to receipt of a session establishment notification by transmitting an election parameter packet to each other respective stack member device of the plurality via the detection interface, wherein the election parameter packet is a request to establish a session with the respective stack member device if the respective stack member device is operating in an active state, wherein the IP address of the detection interface is used as a source address in the election parameter packet, wherein the active device election module is further configured to receive a respective incoming election parameter packet from at least one other stack member device of the plurality via the detection interface, and to elect one member device from among the stack device and the at least one other stack member device of the plurality based on both an active device election parameter in the respective incoming election parameter packet and an active device election rule configured in the stack device, and wherein the elected one member device thereafter becomes the only stack member device of the plurality to remain in the active state.

22. The stack device of claim 21, wherein the active device election rule comprises a stored table of all stack member devices of the plurality and a respective active device election parameter associated with each stack member device, and wherein the active device election module is configured to elect the one member device by being configured to compare the active device election parameter in the respective incoming election parameter packet from the at least one other stack member device of the plurality with the respective active device election parameter associated with the at least one other stack member device of the plurality in the stored table.

23. The stack device of claim 21, wherein the active device election module is further configured to transition the stack device to a recovery state upon a determination that the stack device is not the elected one member device.

24. The stack device of claim 21, wherein the detection interface of the stack device is configured to be connected to a Layer 2 switch, and wherein the detection interface of stack device is configured to be communicatively connected to the respective detection interface on each of the other stack member devices of the plurality via the Layer 2 switch.

25. The stack device of claim 21, wherein the session is a Bidirectional Forwarding Detection session.

26. The stack device of claim 21, wherein the detection interface is a Layer 3 physical interface or VLAN interface.

27. The stack device of claim 21, wherein the active device election parameter is any one of or any combination of member ID, device priority, and device CPU MAC address.

* * * * *